June 5, 1962   M. J. McINTYRE   3,037,465
HANGER
Filed Feb. 16, 1961   2 Sheets-Sheet 1

INVENTOR.
MAURICE J. McINTYRE
BY
Robinson & Berry
ATTORNEYS

June 5, 1962
M. J. McINTYRE
3,037,465
HANGER
Filed Feb. 16, 1961
2 Sheets-Sheet 2
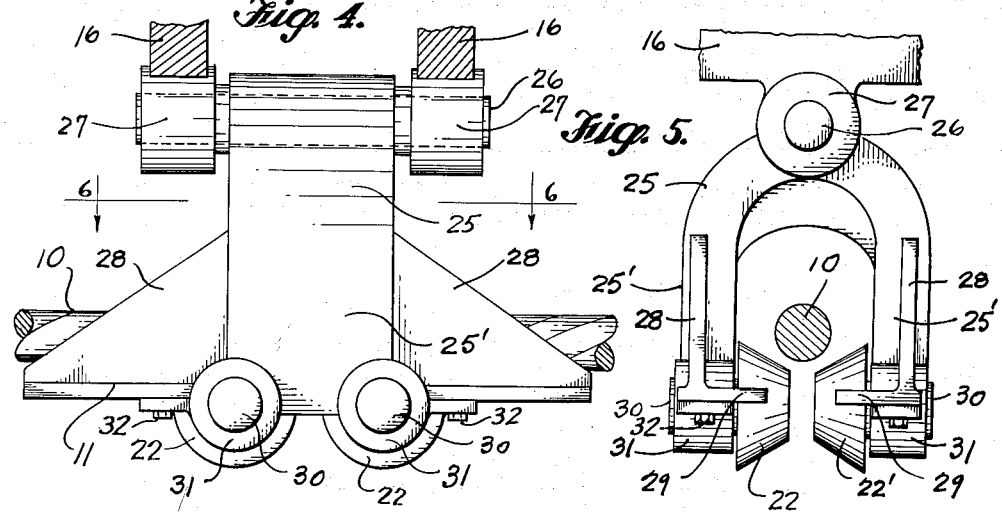
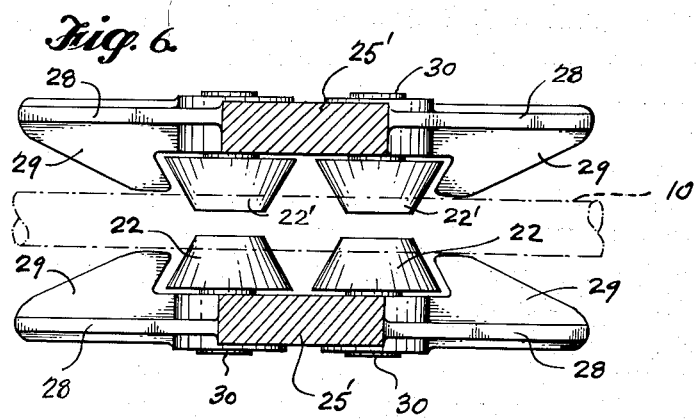
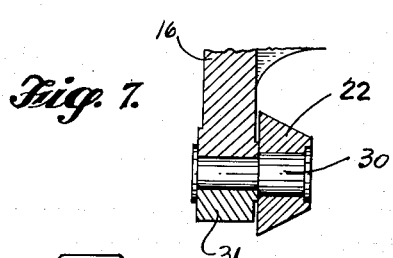
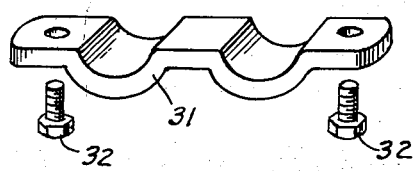
INVENTOR.
MAURICE J. McINTYRE
BY
Robinson & Berry
ATTORNEYS

United States Patent Office 3,037,465
Patented June 5, 1962

3,037,465
HANGER
Maurice J. McIntyre, Sedro-Wooley, Wash., assignor to The Humboldt Company, Seattle, Wash., a corporation of Washington.
Filed Feb. 16, 1961, Ser. No. 89,693
4 Claims. (Cl. 105—151)

This invention relates to equipment employed in aerial logging and in similar operations. More particularly, it has reference to improvements in safety devices used in conjunction with hangers as employed for the suspending of heavy objects from wheeled carriages that travel on "skyline" cables, high lead cables or on cable tramlines and the like.

Explanatory to the present invention, attention is directed to that United States patent issued to Sidney S. McIntyre under No. 2,600,066 based on a certain type of open sided, wheeled carriage designed for travel on a skyline cable as used in aerial logging; this cable being supported at intervals between its ends by suspended jacks over and across which the wheels of the carriages are required to pass and when moving at substantial speed, may be bounced from the cable.

It has happened that means suspending heavy leads from such a wheeled carriage have broken with a resultant catapulting of the carriage from the taut skyline incident to its rebound. In view of such undesirable happenings, it has been the principal object of this invention to provide novel means in connection with wheeled carriages and their load suspending hangers that will prevent the carriage wheels being bounced or otherwise displaced from the skyline cable, incident either to the catapulting action that results from the breaking of a load suspending means or by reason of the bouncing action imparted to the carriage in the passing of its wheels over the skyline supporting shoes or jacks.

It is also an object of the present invention to provide relatively inexpensive and effective means for the above stated purpose that is characterized by the application of one or more sets of paired rollers to the hanger in position to cooperatively contact the underside of the cable on which the carriage wheels travel, thus to overcome any force tending to displace the carriage wheels from the cable.

It is also an object of the present invention to provide for temporary removal of the retaining rollers from the hanger in order to permit removal, when such is desired, of the carriage from the skyline cable or its placement thereon.

Further objects and advantages of the invention reside in the details of construction of parts and in their combination and mode of use, as will hereinafter be fully described.

In accomplishing the above mentioned and other objects of the invention, I have provided the improved details of construction, the preferred forms of which are illustrated in the accompanying drawings, wherein:

FIG. 4 is an enlarged side view of the retaining rolls and their mounting yoke with skyline cable passing between the yoke arms.

FIG. 5 is an end view of the parts as shown in FIG. 4.

FIG. 6 is a horizontal section taken on line 6—6 in FIG. 4.

FIG. 7 is a sectional detail particularly illustrating the axial pin of one of the retaining rollers as mounted thereon.

FIG. 8 is an enlarged perspective view illustrating the means of attaching the clamping caps.

Figure 1:
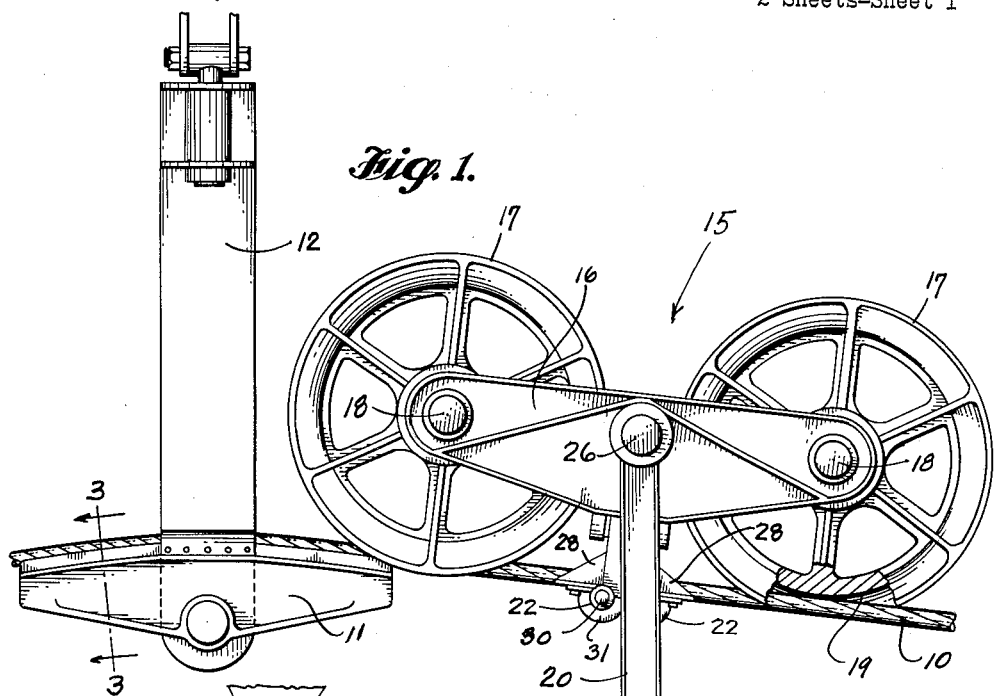
FIG. 1 is a view, showing in side elevation, a wheeled carriage mounted for travel on a "skyline" cable that may be supported at intervals therealong by jacks; the carriage being equipped with a hanger for suspending a load for conveyance and with which carriage and hanger the present improvements are embodied.

Referring more in detail to the drawings:

In FIG. 1, I have illustrated a short length of skyline cable 10 as supported between its ends upon and along the troughed top edge surface of a metal supporting jack or shoe 11. It is shown in FIG. 1 that the jack or shoe 11 is horizontally disposed and between its ends is fixed to the lower end of the hanger 12; and in FIG. 2 it has been shown that the body portion of the hanger 12 is offset to the side of the vertical plane of the supported cable 10 and that the jack 11 extends parallel with the plane of the cable. The top edge of the shoe 11 is slightly crowned between its ends and this edge is longitudinally troughed to seat the cable 10 therein. It is also to be noted that the metal plate from which the jack 11 is formed is quite thin below the troughed top edge, as has been disclosed in FIGS. 2 and 3.

The carriage which travels on cable 10 is designated in its entirety in FIG. 1 by reference numerals 15. It comprises a frame having paired laterally spaced opposite side beams 16—16 between the opposite ends of which paired wheels 17—17 are mounted for rotation on axles 18—18 mounted by and extended between the beams; these wheels being equal in diameter and circumferentially grooved, as at 19 to seat and follow the cable 10, as will be understood by reference to FIG. 2.

Pivotally suspended from the near side of the carriage frame, as seen in FIG. 1, is a hanger 20 which is here shown to be equipped at its lower end with a swivelly attached bearing 21 by which any object or load may be suspended for aerial transportation along the skyline.

Figure 2:
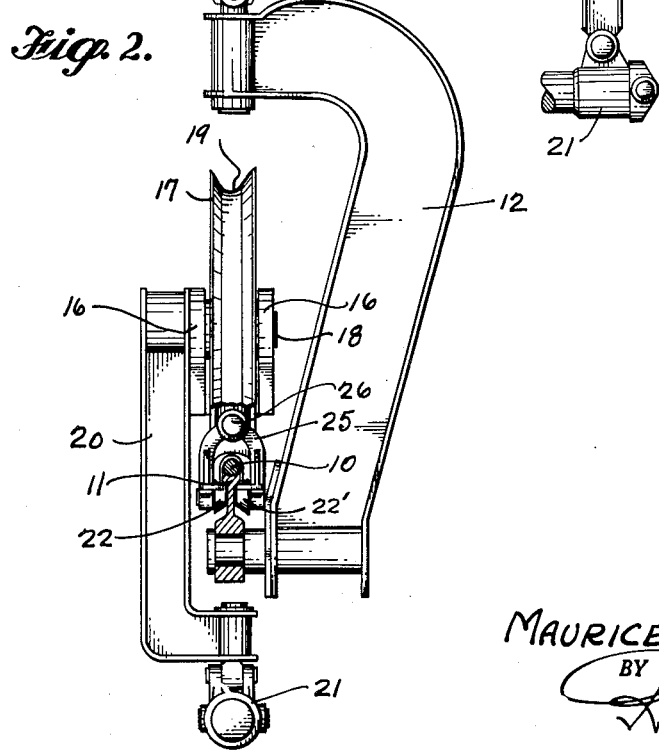
FIG. 2 is a vertical cross-section, showing the location of paired coacting rolls which prevent the carriage wheels being bounced or otherwise displaced from the supporting cable.
Figure 3:
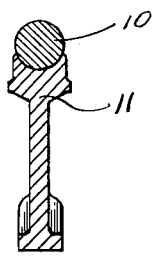
FIG. 3 is a cross-sectional detail of one of the cable supporting jacks, as seen on line 3—3 in FIG. 1.

It will be apparent that if the carriage 15 should be traveling at a relatively high rate of speed along cable 10, in passing across the jack 11 it will be caused to bounce and its wheels are apt to thus be displaced from the cable 10. It has therefore been the object of the present invention to provide a suitable means such as that which has been shown in enlarged detail in FIGS. 4 through 7, to prevent such wheel jumping or displacement. This particular means comprises the two sets or pairs of coacting, conically tapered rolls 22—22'; the rolls of each pair being horizontally mounted in axial alignment and transversely of the cable with their smaller end portions spaced a distance that will permit the body plate of the shoe 11 to be passed between them in the manner illustrated in FIG. 2, when the carriage passes across the jack. These paired rolls are of equal diameter and are mounted on the inside surfaces and at the lower ends of the laterally spaced legs 25'—25' of an inverted U-shaped carrier 25 that is pivoted at its upper, closed end by a cross shaft 26, as shown in FIGS. 2, 4 and 5, that extends between the bearings 27—27 formed on the lower edges of the laterally spaced opposite side plates 16—16 of the carriage frame. Each of the legs of the U-shaped piece is formed with vertical wing portions 28 extending therefrom, as best shown in FIG. 6, and parallel with the direction of extension of the cable 10. These wings are formed with horizontal guide flanges 29 on their inside surfaces providing converging edges at opposite sides of the yoke, for guiding the yoke as the carriage passes onto the jack plate. It is shown in FIG. 6 that the inner ends of aligned rollers are in such spacing that the jack plate may pass between them but the rollers will retain the cable 10 to operate as retaining stops to prevent lifting of the wheels 17—17 from the cable. However, the cable 10 normally is clear of the rollers as has been shown in FIG. 5 and they engage it only when the carriage is bounced or upwardly displaced.

The paired rolls 22—22' are mounted for free rotation on axial pins 30 that are secured to the lower ends of the yoke arms 25'—25' by clamping caps 31—31. When it is desired to remove a carriage from the cable 10, the caps 31—31 are removed by removing the securing bolts 32—32 which are screwed into the flanges 29—29. The cable 10 may then be lowered from within or lifted onto the space between the yoke arms 25'—25'. This should be apparent by reference to FIG. 5.

It is further to be observed that the flanges 29—29 that guide the yoke in its passage over the jacks are spaced sufficiently to not interfere with entry or exit of the cable to the space between the yoke arms.

The retaining means as above described is relatively inexpensive, simple in its construction and mode of application, and effective in its purpose.

What I claim as new is:

1. A carriage for travel along a skyline cable which is intermittently supported by cable jacks that include plate-like shoes attached to the lower ends thereof, said carriage comprising a frame, a pair of spaced circumferentially grooved wheels mounted by said frame, a load hanger suspended from said frame, an inverted U-shaped member secured to said frame and extending below said wheels in position for the passing of the skyline cable and said plate-like shoe between its leg portions and paired cable engaging rollers mounted by said legs in transverse spaced relationship to pass the shoe between them as the carriage passes across the jack and in position to engage the underside of the cable to prevent upward displacement of the wheels therefrom in the travel of the carriage along the cable.

2. A carriage as in claim 1 wherein said U-shaped member is pivotally secured to said frame to permit relative movement therebetween.

3. A carriage as in claim 1 wherein the frame comprises longitudinal, laterally spaced beams mounting said circumferentially grooved wheels in tandem between their opposite ends and wherein said U-shaped member is pivoted between said laterally spaced beams for transverse oscillation and in position to pass said skyline cable between its leg portions as the carriage travels, and said cable engaging rollers being in such spaced relationship as to pass the jack but of lesser spacing than the diameter of the cable.

4. A carriage as in claim 1 wherein said cable engaging rollers are removably mounted for the application of the carriage to and its removal from the cable, and to retain the carriage supporting wheels in engagement with the cable.

References Cited in the file of this patent

UNITED STATES PATENTS

| | | |
|---|---|---|
| 478,046 | Butler | June 28, 1892 |
| 1,846,537 | Withrow | Feb. 23, 1932 |